(12) United States Patent  (10) Patent No.: US 9,189,038 B2
Hartman et al.  (45) Date of Patent: Nov. 17, 2015

(54) COOLING FAN SUSPENSION VIBRATION FILTER

(71) Applicant: Dell Products L.P., Round Rock, TX (US)

(72) Inventors: Corey D. Hartman, Hutto, TX (US); Jose A. Nava, Cedar Park, TX (US)

(73) Assignee: Dell Products L.P., Round Rock ( * ) Notice: Subject to any disclaimer, the term of this patent is extended or adjusted under 35 U.S.C. 154(b) by 484 days.

(21) Appl. No.: 13/644,431

(22) Filed: Oct. 4, 2012

(65)  Prior Publication Data

US 2014/0098487 A1  Apr. 10, 2014

(51) Int. Cl.
| | |
|---|---|
| G06F 1/20 | (2006.01) |
| H05K 7/20 | (2006.01) |
| G05B 21/00 | (2006.01) |
| H02P 1/54 | (2006.01) |
| F04D 29/58 | (2006.01) |
| F04D 29/66 | (2006.01) |
| F04D 25/06 | (2006.01) |
| F04D 25/16 | (2006.01) |
| F04D 29/52 | (2006.01) |
| F04D 29/60 | (2006.01) |

(52) U.S. Cl.
CPC ............ *G06F 1/206* (2013.01); *F04D 25/0613* (2013.01); *F04D 25/166* (2013.01); *F04D 29/522* (2013.01); *F04D 29/58* (2013.01); *F04D 29/601* (2013.01); *F04D 29/66* (2013.01); *F04D 29/668* (2013.01); *G06F 1/20* (2013.01); *G05B 2219/41333* (2013.01)

(58) Field of Classification Search
CPC ................... G05B 2219/41333; F04D 29/58; F04D 29/66; G06F 1/20; G06F 1/206
USPC ........ 700/280; 361/679.46–679.54, 688–697, 361/701–711; 318/41, 49
See application file for complete search history.

(56)  References Cited

U.S. PATENT DOCUMENTS

| | | | |
|---|---|---|---|
| 5,186,605 A | 2/1993 | Tracy | |
| 5,208,730 A | 5/1993 | Tracy | |
| 7,282,873 B2 * | 10/2007 | Abali et al. | ...................... 318/41 |
| 7,362,569 B2 * | 4/2008 | Chen | ........................ 361/679.48 |
| 2002/0048147 A1 | 4/2002 | Miyahara et al. | |
| 2008/0043430 A1 * | 2/2008 | Chen | ........................... 361/687 |
| 2008/0302622 A1 | 12/2008 | Ohtake et al. | |
| 2009/0046420 A1 | 2/2009 | Argumedo et al. | |
| 2012/0281354 A1 | 11/2012 | Rothkopf et al. | |

* cited by examiner

*Primary Examiner* — Courtney Smith
*Assistant Examiner* — Zhengfu Feng
(74) *Attorney, Agent, or Firm* — Terrile, Cannatti, Chambers & Holland, LLP; Robert W. Holland

(57) ABSTRACT

An information handling system cooling fan has a vibration filter that tunes out predetermined fan vibration frequencies to reduce fan vibration transfer from the cooling fan to an information handling system chassis in a targeted frequency range. For example, a leaf spring and damper are biased between the cooling fan and a fan bay support so that stiffness of the spring attenuates selected vibration frequency ranges of the cooling fan bay subsystem, such as frequency ranges where the vibrations have the greatest amplitude or frequency ranges where the vibrations tend to damage other components of the information handling system.

17 Claims, 4 Drawing Sheets

COOLING FAN SUSPENSION VIBRATION FILTER

BACKGROUND OF THE INVENTION

1. Field of the Invention

The present invention relates in general to the field of information handling system cooling subsystems, and more particularly to an information handling system cooling fan suspension vibration filter.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a large variety of components assembled in a housing that cooperate to process information. Many of the components operate on electrical power, which creates heat as a by-product of normal use. In order for many electrical components to operate properly, excess heated generated by the consumption of electrical power typically is removed from the housing, such as by blowing a cooling airflow through the housing with a cooling fan. Thermal sensors within the housing measure temperatures and provide the sensed temperatures to a cooling fan controller. The cooling fan controller varies the speed at which cooling fans operate so that thermal conditions within the information handling system housing are maintained within defined operational parameters. If thermal conditions become extreme, components can fail due to thermal stress or their life can be substantially shortened. Alternatively, the information handling system can throttle or power down components in order to decrease the amount of thermal energy released in the housing. Although extreme thermal conditions are typically avoided with system cooling fans which can push airflow across a higher static pressure, the higher rotational speed for these fans tend to have louder acoustics, generate more vibration and consume more power consumption.

Generally, information handling systems operate with minimal acoustics since many of the electrical components used to build information handling systems which generate heat make use of heat sinks or require lower airflow volumes to keep them cool. Cooling fans represent the most significant source of acoustics in a typical information handling system. Loud acoustics during times of thermal stress due to high fan speed operations can distract information handling system end users. In addition, high fan speed acoustics and related cooling fan vibrations can result in damage to information handling system components. For example, vibrations generated by a cooling fan sometimes transfer to electrical components causing physical damage to the components over time. One example of such damage is breaking or cracking of motherboard connections to electrical components, such as solder that holds pins of electrical components in place. Another example of such damage is wear and reduced performance of hard disk drives due to vibration that transfers to the rotating magnetic storage disk found in typical hard disk drives. One technique used by information handling system manufacturers to minimize the impact of cooling fan vibrations on acoustics and on operation of other components is to install dampers at coupling points that hold a cooling fan in place. For example, rubber or plastic grommets install at the positions where screws or bolts couple the cooling fan to the information handling system chassis, such as the corners of the cooling fan with an interface directly to the fan carrier or the fan bay itself. The amount of damping depends upon the type of material used for the grommets and provides dampening across the frequency spectrum of vibrations associated with cooling fan operations by absorbing energy at the point of support of the cooling fan. Isolation of cooling fan vibrations with grommets is only capable of reducing amplitudes in limited frequency ranges, with generic dampening across that limited frequency range, without regard to the impact that vibrations in a particular frequency range have on information handling system operations.

SUMMARY OF THE INVENTION

Therefore a need has arisen for a system and method which targets selected frequency ranges of cooling fan vibrations to tune and filter during cooling fan operation.

In accordance with the present invention, a system and method are provided which substantially reduce the disadvantages and problems associated with previous methods and systems for reducing the impact of cooling fan vibrations on information handling system operations. A vibration filter tunes out a defined range of vibration frequencies generated by a cooling fan to limit transfer of vibrations in the range to an information handling system. For example, a leaf spring inserts between a cooling fan and information handling system chassis to introduce a stiffness that provides a notch filter of vibrations in a targeted frequency range.

More specifically, an information handling system processes information with processing components, such as a processor and memory disposed in a chassis. One or more cooling fans generate a cooling airflow through the chassis to remove heat created as a by-product of the processing components. The cooling fan creates vibration energy due to rotation of fan blades by a motor. The vibration energy is transferred from the cooling fan to the chassis, such as through a support surface that supports the cooling fan in the chassis. A vibration filter disposed between the cooling fan and support surface tunes out a predetermined range of less than all vibration frequencies, such as attenuating the targeted vibration frequencies with an adjustment of the natural frequency of the cooling fan bay subassembly. For example, the vibration filter is a leaf spring having a stiffness k and a dampening element have a dampening effect c selected to tune out a desired range of frequencies. In one example, embodiment, the stiffness k of a leaf spring biased between a cooling fan and support is selected to tune out a range of vibration frequencies having relatively large amplitude. In an alternative embodiment, the stiffness is selected to tune a range of frequencies associated with damage to other components disposed in the information handling system, such as a hard disk drive.

The present invention provides a number of important technical advantages. One example of an important technical advantage is that frequency ranges for cooling fan vibrations are tuned and filtered to limit the impact of fan operations on acoustics and on other components of an information handling system. A notch filter disposed with a cooling fan limits the transmission of fan vibration to a chassis fan tray to isolate harmful frequency ranges of the vibrations from other components, such as hard disk drives. Unlike dampening grommets, which dampen vibrations only above a given frequency range, the notch filter can be tuned and targets vibrations in specific frequency ranges to attenuate vibration of concern. Adjustable spring stiffness and damper values allow designers to adjust a notch filter based upon the characteristics of a particular information handling system and cooling fan. Attenuating vibrations with a notch filter reduces the need for dampening so that a wider range of grommet geometries and materials may be selected for an information handling system to provide reduced cooling system depth and cost. In one embodiment, adapting a notch filter to an information handling system for neutralizing a targeted frequency range is managed in a cost effective manner by selecting from a wide range of commercially available leaf spring deflections and geometries.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A vibration filter tunes selected frequencies of cooling fan vibrations from transfer to an information handling system chassis by attenuating the selected frequencies. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
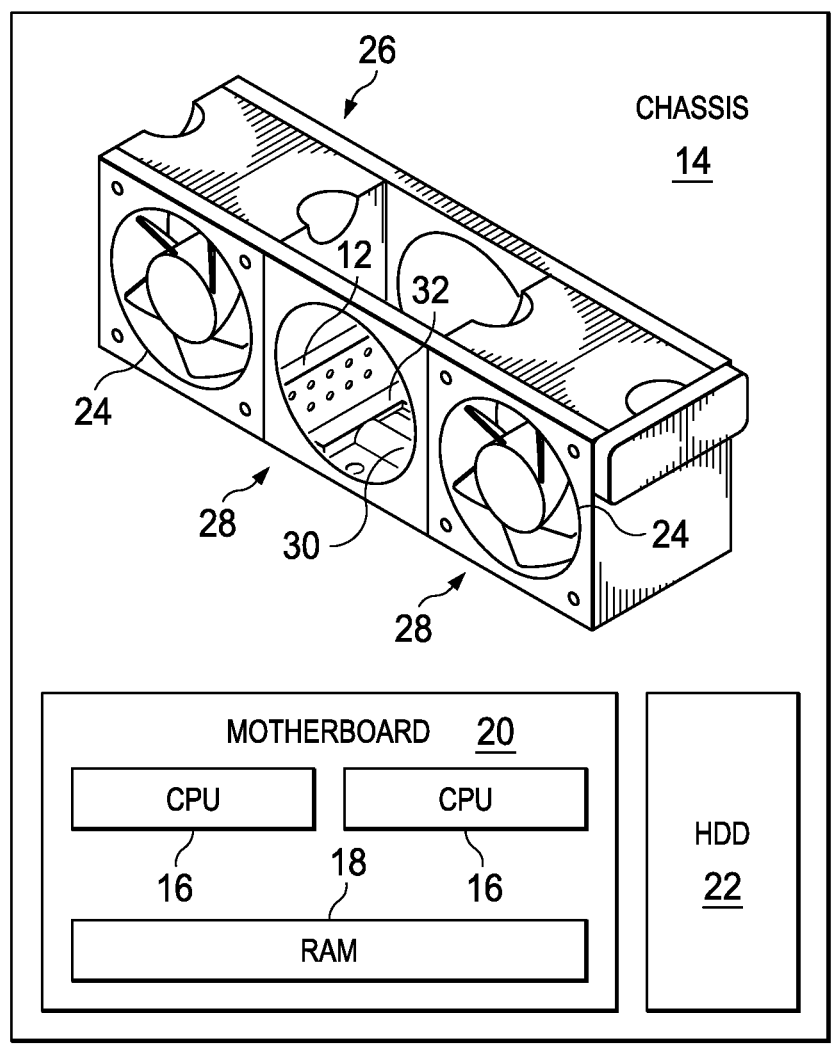
FIG. 1 depicts an information handling system having a cooling fan vibration filter.

Referring now to FIG. 1, an information handling system 10 is depicted having a cooling fan vibration filter 12. Information handling system 10 has plural components disposed in chassis 14 that cooperate to process information. For example, one or more processors 16 and random access memory (RAM) 18 communicate through a motherboard 20 to process information stored in a hard disk drive 22. Heat generated as a by-product of processing information is removed from chassis 14 by one or more cooling fans 24 aligned to blow a cooling airflow over the components by a cooling fan bay 26. Cooling fan bay 26 has plural slots 28 that each accepts a cooling fan 24. For example, hot-pluggable cooling fans 24 insert into slots 28 to align with power and control connectors for automated operation. During operation of information handling system 10, cooling fans 24 run at variable speeds to maintain desired thermal constraints within chassis 14. For example, as thermal sensors detect a rise in temperatures within chassis 14, cooling fans 24 rotate at faster speeds to generate more cooling airflow for cooling chassis 14.

Rotation of a motor and fan within a cooling fan 24 generates vibrations across a frequency spectrum that transfer to chassis 14 through cooling fan bay 26. The frequency and amplitude of vibrations depend upon the speed at which cooling fan 24 runs. Vibration filter 12 is disposed between cooling fan 24 and chassis 14, such as at the base of cooling fan bay 26, to filter a predetermined range of vibration frequencies from transfer to chassis 14. For example, vibration filter 12 has a spring element 30 and a damper element 32 tuned to a range of vibration frequencies so that the tuned range of vibration frequencies of fanbay subsystem 26 are attenuated and therefore do not transfer to chassis 14. The tuned frequency range for a particular information handling system can depend on a number of factors. In one embodiment, vibration filter 12 tunes out a frequency range associated with vibrations having relatively large amplitude relative to the amplitudes of other frequency ranges. In an alternative embodiment, vibration filter 12 tunes out a frequency range associated with damage to another component of information handing system 10, such as RAM 18 or hard disk drive 22. For instance, hard disk drive 22 rotates a magnetic disk at a speed that amplifies oscillations of a range of frequencies for vibrations external to the hard disk drive, resulting in a greater risk of failure when such vibrations are present. Vibration filter 12 increases hard disk drive 22 reliability by tuning out cooling fan 24 vibrations in the range of frequencies associated with damage to hard disk drive 22. Although vibration filter 12 is depicted as disposed between cooling fan 24 and the bottom support surface of cooling fan bay 26, in alternative embodiments, vibration filter 12 is placed in alternative locations, such as directly between cooling fan 24 and chassis 14, directly between cooling fan bay 26 and chassis 24, and directly between adjacent cooling fans 24.

Figure 2:
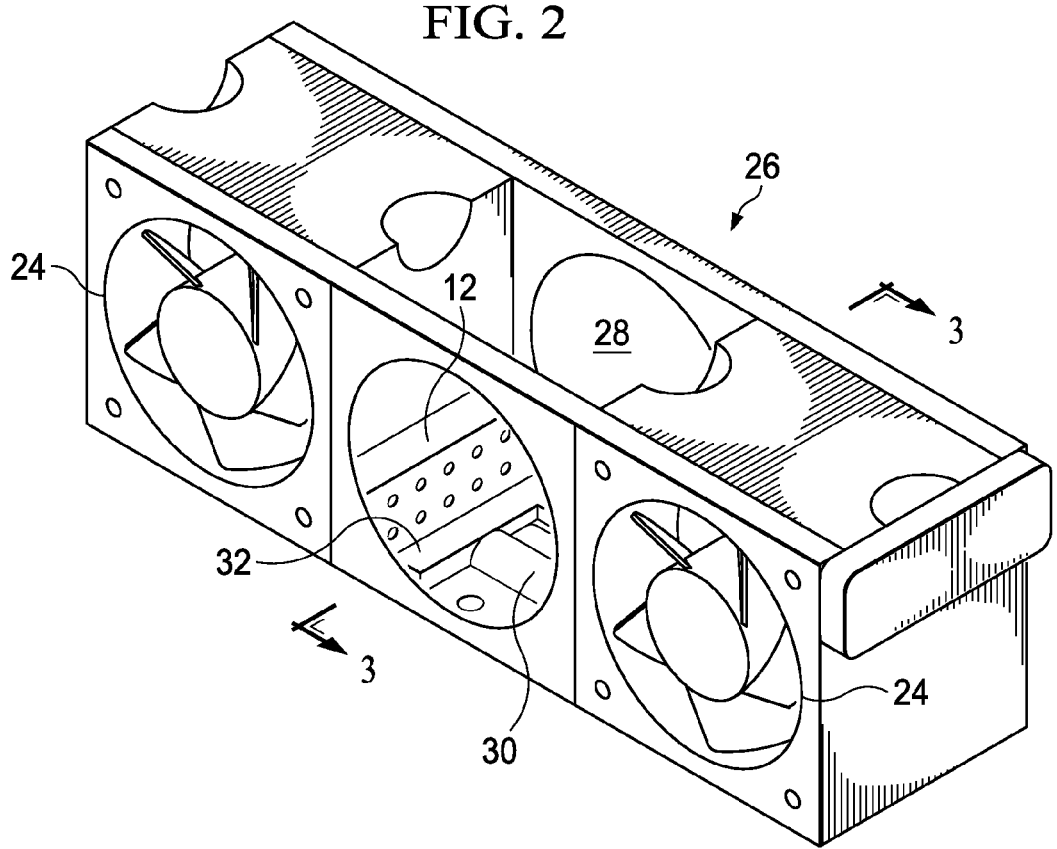
FIG. 2 depicts a top perspective view of an information handling system cooling fan bay having a cooling fan vibration filter.

Referring now to FIG. 2, a top perspective view depicts an information handling system cooling fan bay 26 having a cooling fan vibration filter 12. Cooling fan bay 26 has cooling fans 24 inserted in side slots 28 and an empty middle slot 28 prepared to accept a cooling fan. The bottom surface of middle slot 28 has a vibration filter 12 coupled to it so that a cooling fan inserted into slot 28 will rest on vibration filter 12. In the example embodiment, vibration filter 12 has a spring element 30 and damper element 32 disposed as separate parts that work together to tune out a natural frequency of cooling fan 24 when inserted into slot 28. In alternative embodiments, vibration filter 12 couples at alternative locations, such as the bottom surface of a cooling fan 24 so that insertion of the cooling fan 24 into slot 28 will compress spring element 30 and damper element 32 against the bottom surface of bay 26. Although cooling fan bay 26 provides a convenient frame for aligning cooling fans 24 and holding cooling fans 24 in place other types of supports may be used to hold a cooling fan 24 against the bottom surface of a fan tray with a vibration filter 12 disposed between the support surface and the cooling fan.

Figure 3:
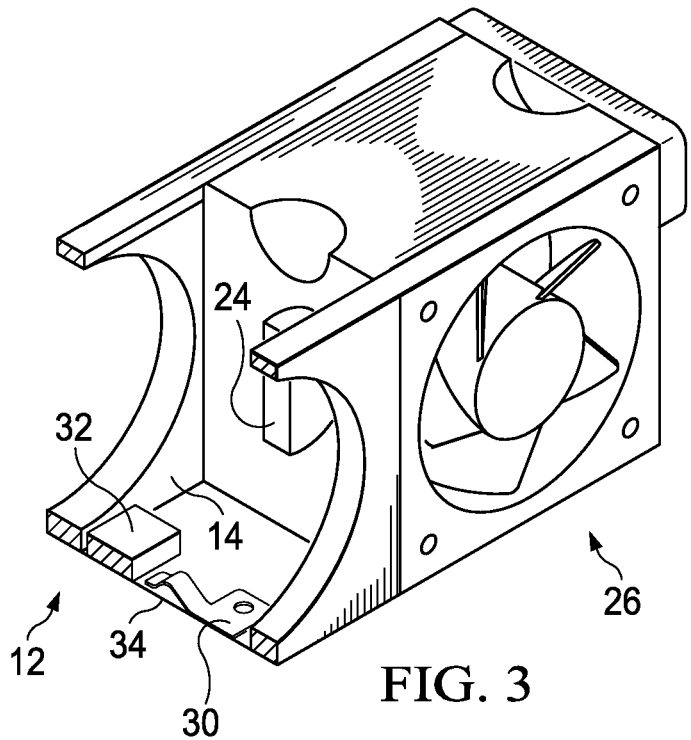
FIG. 3 depicts a side cutaway view of a cooling fan vibration filter disposed to reduce transfer of a predetermined cooling fan vibration frequency range to an information handling system chassis.

Referring now to FIG. 3, a side cutaway view depicts a cooling fan vibration filter 12 disposed to reduce transfer of a predetermined cooling fan vibration frequency range to an information handling system chassis 14. Cooling fan 24 is a vibration source with its vibrations transferred through a support surface 34 of cooling fan bay 26 to chassis 14. Spring element 30 is a leaf spring partially compressed between cooling fan 24 and support surface 34 and having a stiffness value k. Damper element 32 is damper material having a dampening value c. The stiffness k is designed, in accordance with mass of fan 24, so that the natural frequency of vibrations generated by cooling fan subsystem 26 is tuned so the frequency range of concern is effectively attenuated and therefore not transmitted outside of support surface 34, such as to chassis 14. Although the example embodiment depicts spring element 30 separate from damper element 32, in an alternative embodiment, spring element 30 and damper element 32 are combined into a single component. In another alternative embodiment spring element 30 and damper element 32 are disposed in different locations. For instance, spring element 30 is placed on support surface 34 while damper element 32 is placed at coupling points of cooling fan 24 to chassis 14. In another alternative embodiment, one or more coil spring are used at coupling points of cooling fan 24 with dampener elements disposed at support surface 34. Various placements of spring elements 30 and damper elements 32 may use various values of k and c to tune vibration filter 12 to a desired vibration frequency range so that a suspension of cooling fan 24 relative to chassis 14 mitigates the propagation of vibration energy emitted by cooling fan 24 to chassis 14. In yet another embodiment, spring element 30 includes a vibration source that actively creates out-of-phase vibrations to cancel vibrations emitted by cooling fan 24, such as an off-center rotating weight that rotates a speed to create a desired vibration. In alternative embodiments, the vibration source is place in other locations of cooling fan 24 and interfaced with an accelerometer to adjust created vibrations in response to cooling fan vibrations detected by the accelerometer.

Figure 4:
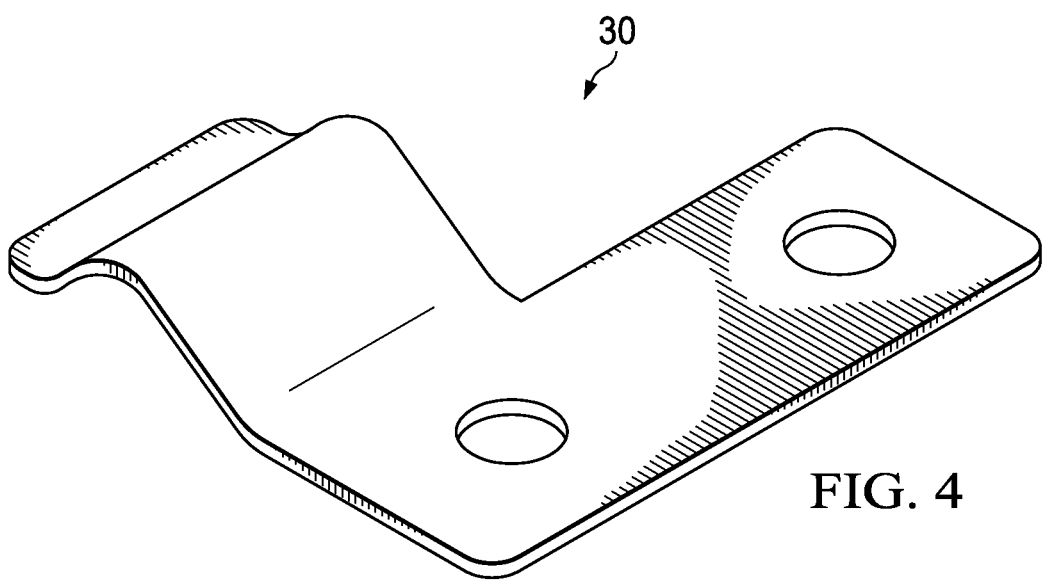
FIG. 4 depicts an example embodiment of a cooling fan vibration filter.

Referring now to FIG. 4, an example embodiment depicts a cooling fan vibration filter 12. Spring element 30 disposes between a cooling fan and chassis to filter vibrations of the cooling fan. Different stiffness values and geometries of spring element 30 provide the ability to target desired frequency ranges for filtering. In the example embodiment, spring element 30 is a leaf spring that couples to a support surface or cooling fan to bias against motion between the support surface and cooling fan. When combined with a foam dampener material of selected height, surface area and density, leaf spring 30 counteracts vibrations of a cooling fan. In one embodiment, a leaf spring 30 is place against hard stops of a cooling fan support along each of plural axes so that vibration loading along each axis is canceled out from transfer through the hard stop.

Figure 5:
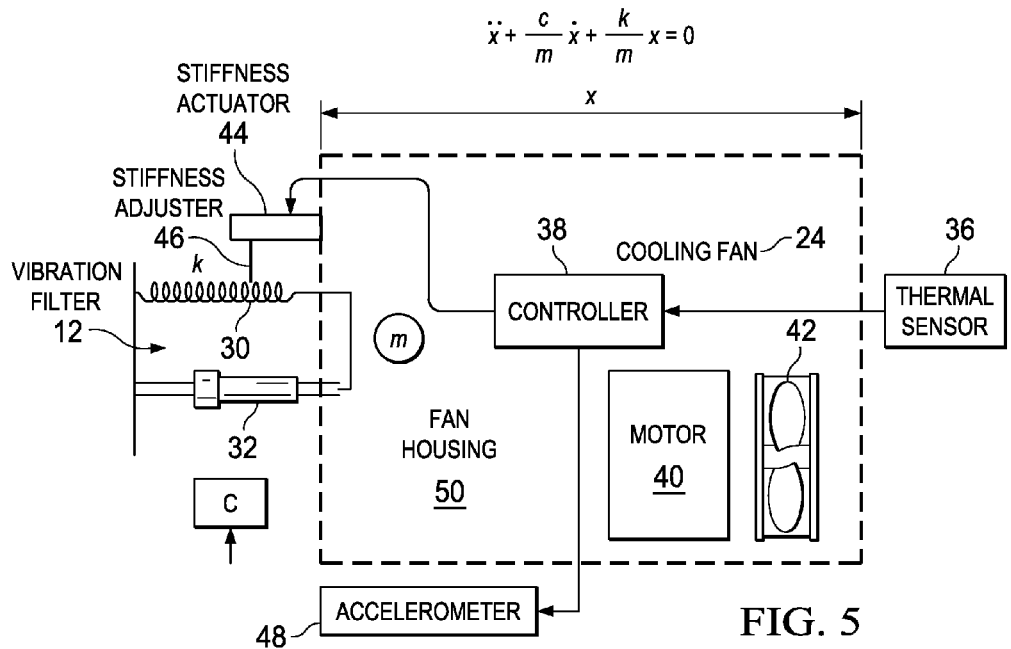
FIG. 5 depicts a frequency and acceleration amplitude graph of an example of a vibration frequency range tuned out by a vibration filter.

Referring now to FIG. 5, a frequency and amplitude graph depicts an example of a vibration frequency range tuned out by a vibration filter. The Y axis depicts the amplitude of vibrations (shown as acceleration) generated by a cooling fan and the X axis depicts the frequency of the vibrations. The solid line 52 depicts the unfiltered frequency response of the cooling that is transferred to a chassis. Although dampers, such as rubber grommets, can decrease the amplitude of the unfiltered frequency response, the decrease occurs only above a certain frequency range which is dependent upon the material properties of these grommets. In contrast, the dash line 54 depicts the filtered frequency response provided by the cooling fan with a vibration filter is place, such as a leaf spring disposed to bias against the cooling fan and a transfer path for vibrations to the chassis. A tuned frequency notch 56 selectively reduces the amplitude of vibrations in a targeted frequency range, such as the frequency range having the greatest amplitude or the frequency range associated with damage to other components. In one example embodiment, k and c values are selected so that vibrations in the frequency of 600 to 1000 Hz are tuned out as a way to limit interference with performance of a hard disk drive.

Figure 6:
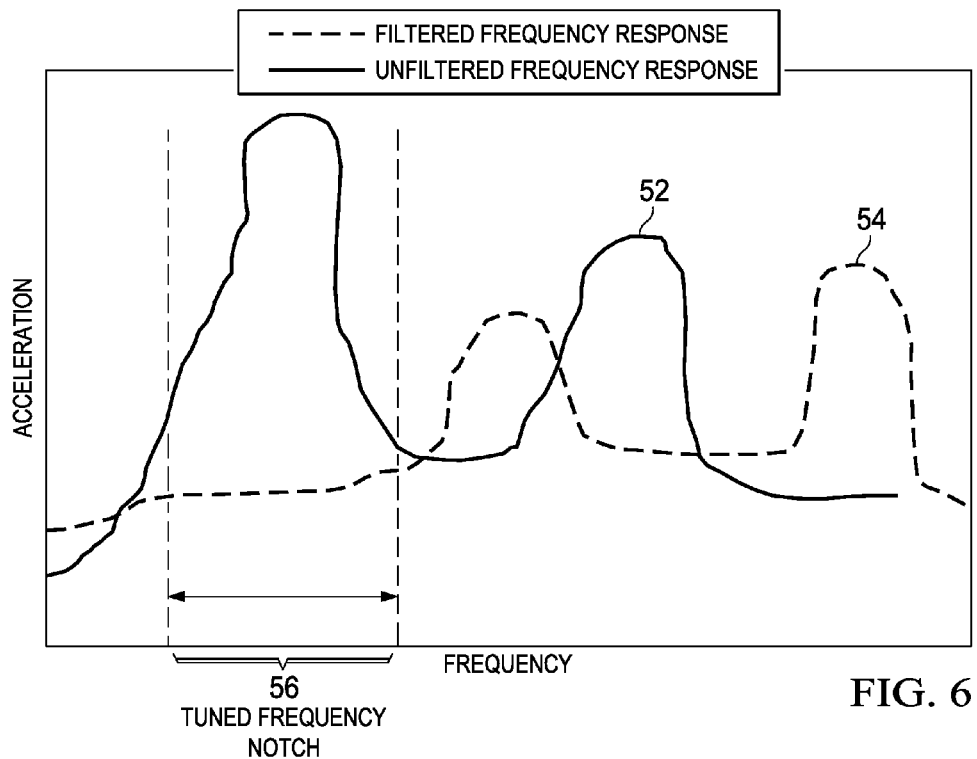
FIG. 6 depicts a block diagram of a cooling fan and vibration filter having a frequency range tuned with adjustable spring stiffness.

Referring now to FIG. 6, a block diagram depicts a cooling fan 24 and vibration filter 12 having a frequency range tuned with adjustable spring stiffness k. The fundamental natural frequency of cooling fan 24 as tuned by vibration filter 12 is defined by the equation:

$$\omega = \sqrt{k/M}$$

where k is the stiffness of spring element 30 and M is the mass of cooling fan 24. By adjusting the value of spring stiffness and the value c of dampener element 32, the natural frequency provides attenuation of vibrations in a subset of the total range of vibration frequencies from cooling fan 24 and fan subsystem 26. As depicted by the equation set forth in FIG. 6, setting the values of c and k to provide attenuation, and prevent amplification along the X axis provides a notch filter around a tuned frequency range based upon the mass of cooling fan 24. In the example embodiment, thermal sensors 36 detect thermal conditions and provide the thermal conditions to a controller 38. Controller 38 applies the sensed thermal conditions to set a speed at which a motor 40 of cooling fan 24 turns fan blades 42. If sensed thermal conditions exceed thermal constraints, the motor increases its speed to provide additional cooling airflow. If sensed thermal conditions fall below thermal constraints, the motor decreases its speed to decrease power consumption and acoustics.

In the example embodiment, controller 38 interfaces with a stiffness actuator 44, such as a solenoid, which moves a stiffness adjustor 46 to change the stiffness k of spring 30. In this manner, controller 38 adjusts the filtered vibration frequency as fan speed changes. In an alternative embodiment, the value c of damper element 32 is adjusted by controller 38, such as by pressurizing or de-pressurizing a fluid-filled cylinder. Controller 38 adjusts the values of k and c to adjust the notch in the frequency spectrum that is filtered by vibration filter 12 based upon anticipated vibration amplitudes across the frequency spectrum as fan speed changes. As an alternative, an accelerometer 48 coupled to fan housing 50 measures vibrations to provide feedback to controller 38 for adjusting vibration filter 12 based on actual versus anticipated vibration. As another alternative, the vibration filter can integrate entirely within fan housing 50 using a coil spring and dampener cylinder as shown to effect vibrations of cooling fan 24 without physically interacting with chassis 14 or a fan support surface exterior to the fan housing 50.

Although the present invention has been described in detail, it should be understood that various changes, substitutions and alterations can be made hereto without departing from the spirit and scope of the invention as defined by the appended claims.

What is claimed is:

1. An information handling system comprising:
a chassis;
a processor disposed in the chassis to process information;
memory disposed in the chassis and interfaced with the processor to store the information;
a cooling fan disposed in the chassis to generate a cooling air flow over the processor;
a vibration filter disposed between the cooling fan and the chassis, the vibration filter reducing transfer of vibration from the cooling fan to the chassis in a tuned frequency range by biasing the cooling fan against the chassis and dampening the biasing with a damper element; and
a cooling fan bay coupled to the chassis to accept one or more cooling fans, wherein the vibration filter comprises a leaf spring coupled to a bottom surface of the cooling fan bay and aligned to bias against the cooling fan upon insertion of the cooling fan into the cooling fan bay and the damper element comprising a rubber material disposed proximate the leaf spring upon installation of the cooling fan into the cooling fan bay.

2. The information handling system of claim 1 wherein the tuned frequency range comprises a subset of vibration frequencies having a predetermined amplitude.

3. The information handling system of claim 1 wherein the tuned frequency range comprises a subset of vibration frequencies having a predetermined interaction with the memory.

4. The information handling system of claim 1 wherein the vibration filter comprises a spring coupled to the cooling fan and aligned to provide a bias against the chassis upon installation of the cooling fan into the chassis.

5. The information handling system of claim 4 wherein the spring comprises a leaf spring that biases against a cooling fan bay coupled to the chassis and configured to accept the cooling fan.

6. The information handling system of claim 1 further comprising a vibration filter disposed between the cooling fan bay and the chassis.

7. An information handling system comprising:
a chassis;
a processor disposed in the chassis to process information;
memory disposed in the chassis and interfaced with the processor to store the information;
a cooling fan disposed in the chassis to generate a cooling air flow over the processor;
a vibration filter disposed between the cooling fan and the chassis, the vibration filter reducing transfer of vibration from the cooling fan to the chassis in a tuned frequency range by biasing the cooling fan against the chassis and dampening the biasing with a damper element,
wherein the vibration filter comprises:
a leaf spring at least partially compressed against the cooling fan and chassis; and
a damper element at least partially compressed against the cooling fan and chassis;
wherein the leaf spring and damper element are adapted to attenuate cooling fan vibration at the tuned frequency.

8. An information handling system comprising:
a chassis;
a processor disposed in the chassis to process information;
memory disposed in the chassis and interfaced with the processor to store the information;
a cooling fan disposed in the chassis to generate a cooling air flow over the processor;
a vibration filter disposed between the cooling fan and the chassis, the vibration filter reducing transfer of vibration from the cooling fan to the chassis in a tuned frequency range by biasing the cooling fan against the chassis and dampening the biasing with a damper element,
wherein the vibration filter comprises:
a spring having an adjuster to adjust spring stiffness;
an actuator interfaced with the adjuster to adjust the spring stiffness; and
a cooling fan controller interfaced with the actuator to adjust the spring stiffness based upon a cooling fan speed.

9. A method for managing vibration of an information handling system cooling fan, the method comprising:
powering the cooling fan in an information handling system chassis to generate a cooling airflow over one or more components; and
filtering transfer between the cooling fan and the chassis of a predetermined range of vibration frequencies associated with powering the cooling fan, the predetermined range comprising a subset of less than all vibration frequencies associated with the powering of the cooling fan;
wherein filtering transfer further comprises:
setting a cooling fan speed to obtain predetermined thermal constraints in the information handling system chassis; and
adjusting a spring stiffness based at least in part on the cooling fan speed to filter the predetermined range of vibration frequencies, the spring disposed between the cooling fan and the information handling system chassis.

10. The method of claim 9 wherein filtering transfer further comprises:
selecting a spring and a damper that cooperate to attenuate vibrations in the predetermined range; and
compressing the spring and damper between the cooling fan and chassis.

11. The method of claim 10 wherein the spring comprises a leaf spring biased against the cooling fan.

12. The method of claim 9 wherein filtering transfer further comprises:
coupling a cooling fan bay into the information handling system chassis, the cooling fan bay having one or more slots to support a cooling fan;
disposing a spring and damper between the cooling fan bay and cooling fan; and
coupling the cooling fan into the cooling fan bay slot;
wherein the spring and damper interact between the cooling fan and the cooling fan bay to attenuate cooling fan vibrations in the predetermined range of vibration frequencies.

13. The method of claim 12 wherein the predetermined range of vibration frequencies comprises a range of frequencies associated with hard disk or other computer component failures.

14. The method of claim 12 wherein the predetermined range of vibration frequencies comprises a range of frequencies of operation of the cooling fan having a relatively large amplitude compared with other vibration frequencies of operation of the cooling fan.

15. A cooling fan comprising:
a housing;
a fan disposed in the housing, the fan having a motor to turn a blade that creates a cooling airflow;
a support coupling the housing to an information handling system; and
a vibration filter disposed between the housing and the support to tune out transfer of predetermined vibration frequencies from the housing to the support, the vibration filter having a spring element and a damper element, the spring element and damper element aligned to compress between the housing and support;
wherein:
the spring element comprises a leaf spring having a stiffness; and
the damper element comprises a rubber material separate from the spring element; and
the spring element and damper element interact with the housing and the support to attenuate the predetermined vibration frequencies generated by the fan at a tuned frequency notch.

16. The cooling fan of claim 15 wherein the vibration filter comprises a leaf spring biased between the housing and the support.

17. A cooling fan comprising:
a housing;
a fan disposed in the housing, the fan having a motor to turn a blade that creates a cooling airflow;
a support coupling the housing to an information handling system;
a spring having an adjustable stiffness;
an actuator interfaced with the spring to adjust the stiffness; and
a fan controller to set a fan speed and to adjust the actuator according to the fan speed, the stiffness tuning the vibration filter to a selectable vibration frequency associated with the fan speed.

\* \* \* \* \*